Patented May 10, 1938

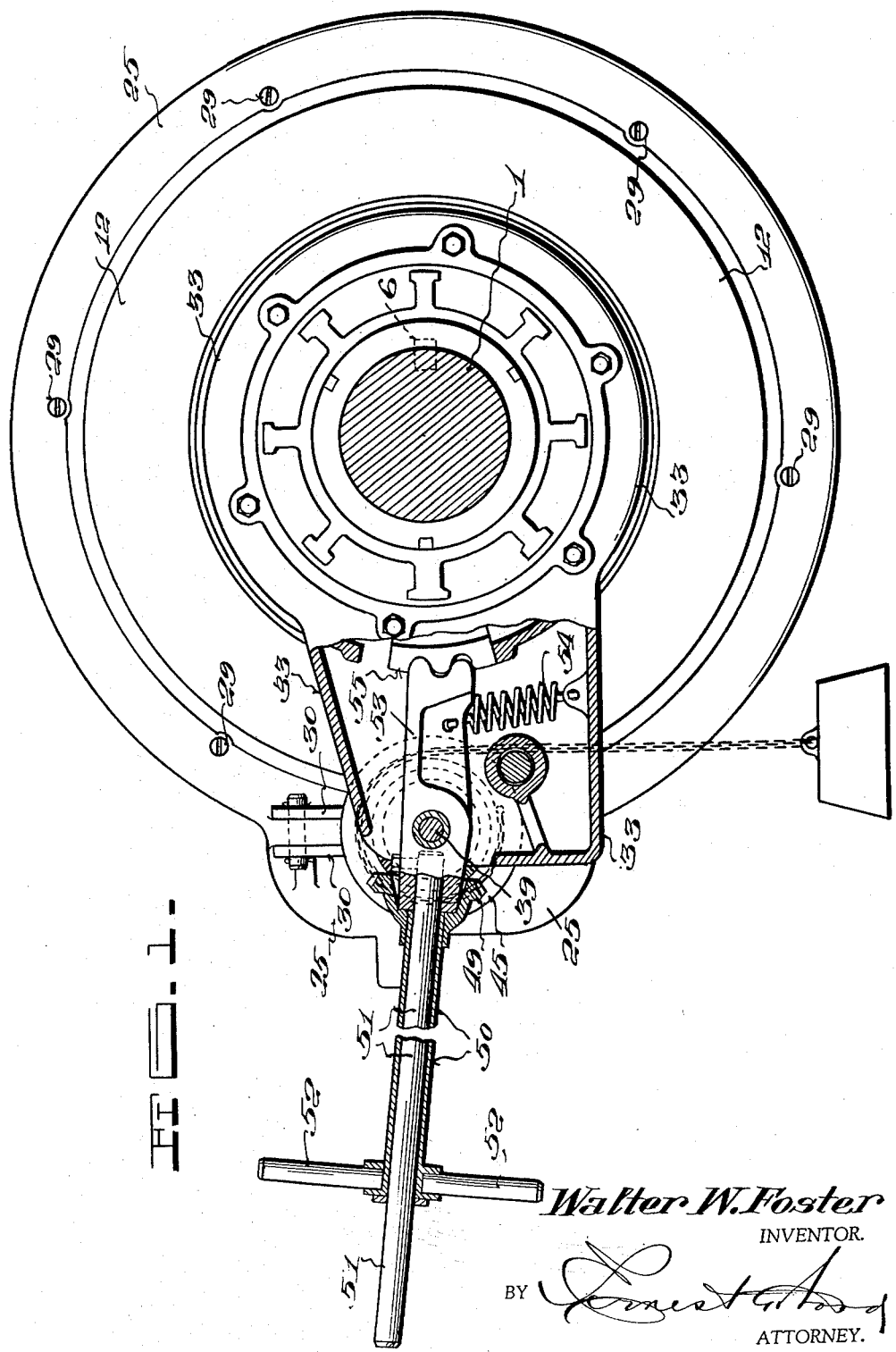

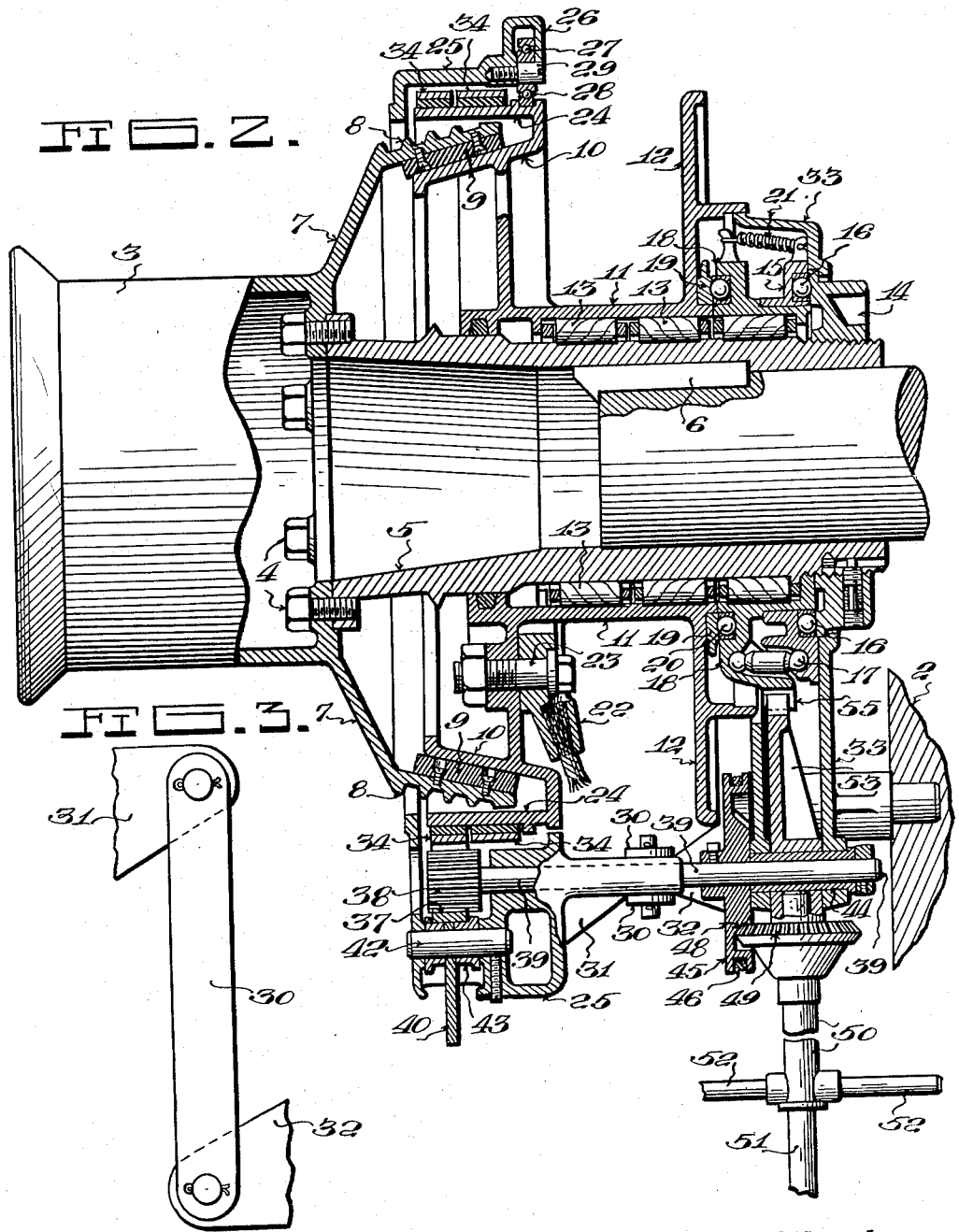

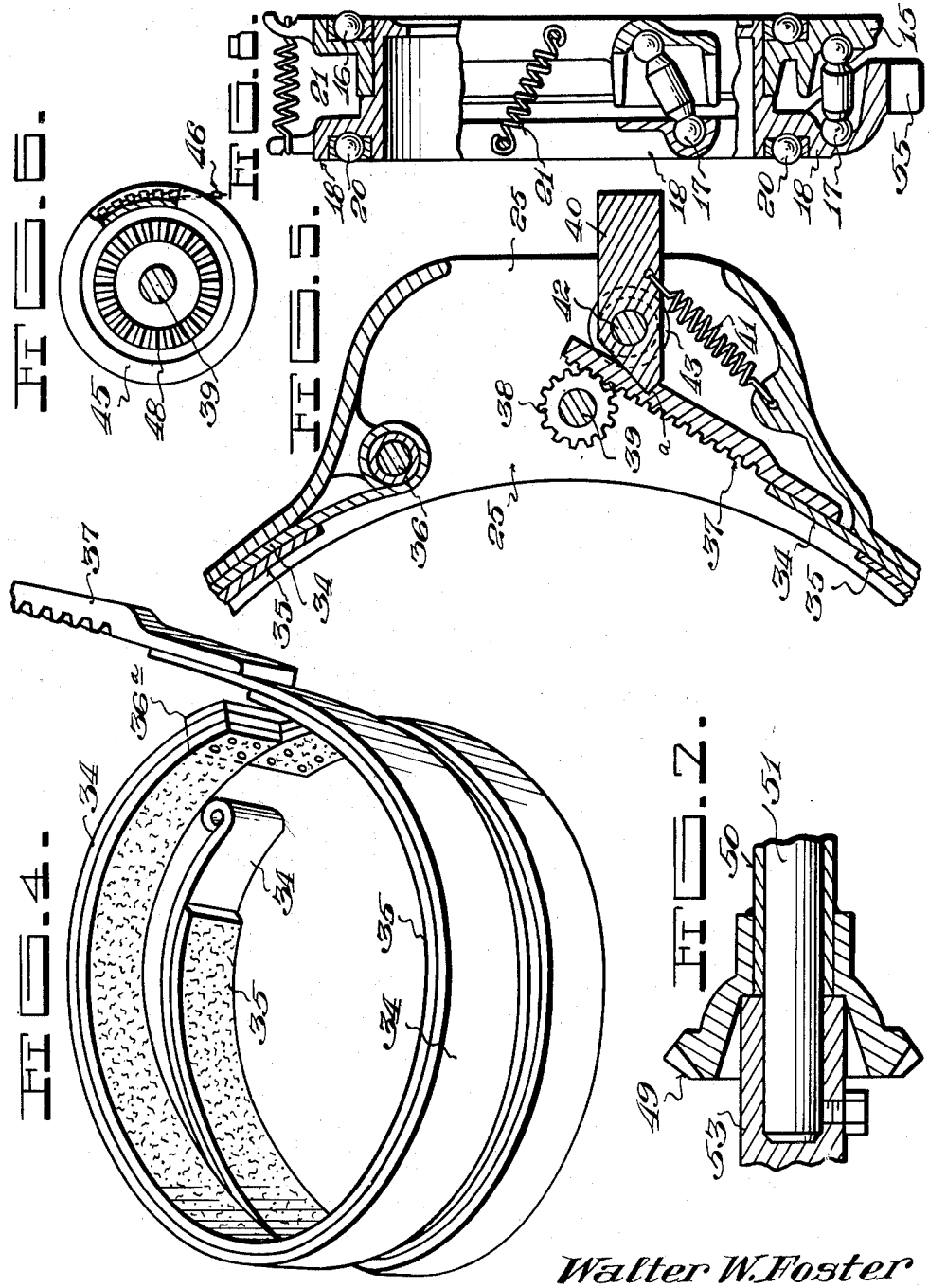

2,116,497

UNITED STATES PATENT OFFICE 2,116,497

SPINNER HOIST CAT-HEAD CONTROL

Walter W. Foster, Wichita Falls, Tex.

Application May 9, 1936, Serial No. 78,786

10 Claims. (Cl. 192—17)

This invention relates to brakes and it has particular reference to a friction clutch and brake with single lever control.

The principal object of the invention is to provide load handling equipment with provisions for automatically and instantaneously transferring the load, hoisted by a friction clutch, from the driving shaft to a stationary or holding member with but a single lever control.

Another object of the invention is to provide in a drum operated by a friction clutch, a control means, which has sufficient power to remove all possible hazards in handling heavy loads, and slippage is practically eliminated. Moreover, the degree of movement possible in lowering a load may be made almost imperceptible by reason of the sensitiveness of the control means.

Still another object of the invention is to provide in a friction clutch, a brake controlled in the manner briefly described, whose band or friction element is so designed as to provide maximum flexibility, responsiveness and braking surface without requiring more than the conventional size width of housing and capable of applying minimum friction to the clutch drum in the lifting direction and positive friction thereto in a reverse direction.

Yet another object of the invention is to provide a friction control having the characteristics of a ratchet, inasmuch as it has a continuous automatic take-up, yet it has the advantages of smooth and noiseless operation with a minimum number of moving parts and is constantly in control of the load until released manually.

Broadly, the invention is designed for use in connection with the structures described in applications filed by the applicant, April 11, 1935 and November 23, 1935, Serial No. 15,919, which has become Patent No. 2,062,705, Dec. 1, 1936, and 51,277, respectively, and its purpose is manifest in that it can be adapted not only for handling heavy equipment in drilling wells but also in the construction of buildings, bridges and many other such uses.

With the foregoing objects as paramount, the invention has particular reference to its salient features of construction and arrangement of parts, to become manifest as the description proceeds, taken in connection with the accompanying drawings, wherein:—

Figure 1 is an end elevation with portions cut away.

Figure 2 is a plan view in horizontal section.

Figure 3 is a detail of a connecting link in the assembly.

Figure 4 is a perspective view of the brake band, per se.

Figure 5 is a fragmentary view of the brake drum and band, in section, showing in detail the anchored and adjustable ends of the band.

Figure 6 is a detail view of the weight sheave and gear.

Figure 7 is a fragmentary view in section of the control lever, gear and connection and Figure 8 is an elevation of the clutch "crowder" mechanism, partly in section.

Continuing with a more detailed description of the drawings, the friction clutch with which the present invention is intended to operate will first be described. As previously stated, this clutch is fully described and claimed in the application filed April 11, 1935, Serial No. 15,919.

In Figure 2, 1 designates a constantly rotating shaft, such as a draw works line shaft and 2, the draw works or stationary post to which the shaft is rotatably journaled. The numeral 3 denotes the conventional type of spool or cat-head which is in fixed relation with the shaft by reason of the fact that it is bolted or otherwise affixed at 4 to a sleeve 5, the latter being secured by key 6 to shaft 1.

The line spool 3 is provided with an integral flange 7, turned slightly inward at its outer edge, as shown in Figure 2 and provided with exterior cooling fins 8. Interiorly of flange 7 there is affixed a brake lining 9. This lining frictionally engages a flange 10 which is integral with a drum 11. This drum 11, it will be observed, is provided with a flange 12 and is spaced from the sleeve 5 by roller bearings 13. Thus, the drum 11 is free to rotate on the shaft 1 while the spool 3 constantly rotates with the shaft.

Threadedly mounted on the sleeve 5 at the end nearest the post 2 is a ring 14 which acts as a thrust plate when it is desired to move the drum 11 so that the friction elements 9 and 10 will become engaged. Particular reference to the means by which this is accomplished will be made presently.

Adjacent the ring 14, there is provided another ring 15, and this ring serves as the inner race for balls 16 while ring 14 serves as the outer race and thrust plate. Disposed in annular spaced relationship about the shaft 1 and having their ends secured for universal movement in ring 15 are pins 17 (Figure 8). The opposite ends of these pins are similarly secured in a ring 18, spaced inwardly from ring 15. A ball race or spacer ring 19 serves to retain balls 20 and separate the elements of the crowder mechanism from the flange 12 of drum 11.

Normally, all of the pins 17 are disposed at a variety of relative angles about the shaft 1, but when the clutch elements 9 and 10 are to be engaged to lock the drum and cat-head for common rotation with the shaft 1, the pins 17 are all moved simultaneously to a position approaching parallel with each other and shaft 1. Thus, the rings 14 and 15 acting as thrust rings, which do not axially move, the inner ring 18 advances the spacer ring 19 and the drum 11 in a direction to effect frictional engagement of the flange 10 with the clutch lining 9. (Figure 2.) Manifestly, only a slight rotative urge need be applied to the ring 18 to so displace the pins 17 to effect the operation described and when the desired result is obtained, a series of springs 21, resisting the described movement of the pins 17, return the latter to normal positions.

The foregoing description deals specifically with the clutch with which the invention is adapted to operate and the latter will now be described in detail.

Accordingly, an end of a line is secured in the socket 22 (Figure 2) and wound upon the drum 11. The socket 22 is rotatively connected by pin 23 to the inner flange of drum 11.

It will be noted that the casting of which drum 11 and its associated elements is constructed, is designed to define a flange 24 which overreaches the friction elements 9 and 10, and more concisely, the cooling fins 8 of the cat-head 3. Surrounding this flange and annularly spaced therefrom is a housing 25 which embraces the enlargement (Figure 5) bearing the same reference character. Lying within an overhanging lip 26 of this housing (Figure 2) is a ball race 27, corresponding with a similar race 28 surrounding the flange 24 of the drum 11. A series of screws 29 hold these races in position, so that free and unrestricted movement between the flange 24 and housing 25 will exist.

When the drum 11 is rotated, it is of course necessary that the housing 25 be held against rotation. Hence, links 30 (Figure 3) are provided and are connected at one end to an ear or projection 31 integral with the housing 25 and at the other end to a similar projection 32, integral with a stationary member 33, a portion of which embraces the shaft 1 (Figures 1 and 2).

It will be understood that member 33 is stationary with the post 2 while the housing 25 is not rotatable but must be capable of axial displacement, since it is connected through bearings 27—28 indirectly to drum 11. Hence, the pivotal links 30, on which is imposed tensional strain only when relative movement of drum 11 and housing 25 occurs, are slightly displaced pivotally when such movement occurs.

Embracing the drum flange 24, which is in fact a brake drum, is a brake or friction band 34, or specifically two bands secured together adjacent their ends in a manner similar to that shown in Figure 4. The bands carry linings 35, (Figure 4) and are connected together by a strip 36a adjacent their ends.

The particular construction of the band is advantageous in that a servo or self energizing action on the brake or clutch drum 24 is obtained. Moreover, this particular construction is more responsive and sensitive than the conventional type of friction control.

One end of the band 34 is anchored to a pin 36 (Figure 5) in the enlarged portion of the housing 25 while the opposite end is displaceable to effect contraction and expansion of the band. A gear rack 37 is affixed to the displaceable end of the band 34 (Figure 5) and its teeth are in mesh with the teeth of a pinion 38 mounted on a shaft 39. The smooth side of the rack 37 is notched at $a$ to receive the corresponding end of a dog or detent 40. This dog is continuously held against the rack 37 by a spring 41 and is not engaged with the notch $a$ except in cases where the drum is required to be held entirely free from the action of the brake. Otherwise, it is manually released to allow the band 34 to contract in the manner to be later explained.

The dog is pivoted on a stub shaft 42, surrounding which is a roller 43, serving to retain the rack 37 in enmeshed relationship with the pinion 38.

It will be understood that the band 34 is normally contracted upon its drum 24, being held thus by a means to be described presently. The action of the band is not unlike that of a ratchet and pawl mechanism in effect, inasmuch as it yields to the rotation of the drum 11 while hoisting a load with minimum friction, yet exerts maximum friction thereon in the opposite direction. Operation of the apparatus with the band 34 in contracted position is normal as a safety factor and the peculiar construction of the band insures positive and instantaneous contraction thereof on the drum 24 to suspend the load.

From the foregoing and from Figure 2, it will be seen that one end of shaft 39 carrying the pinion 38 is disposed in the enlargement of housing 25 while the other end extends into the stationary member 33 where it is journaled in bushing 44 (Figure 2). Near the end of shaft 39 is affixed a pulley or sheave 45 having a peripheral groove therein to receive a chain or cable or other flexible line 46. The line 46 supports a weight 47, as shown in Figure 1.

The sheave 45 is constructed to provide an integral annular gear ring 48 (Figure 6) whose teeth are enmeshed by those of a similar beveled gear 49, mounted upon the end of tubular member 50. The tubular member 50 surrounds the shaft or lever 51 which, together with the tubular member constitutes the single control means of the assembly, as will be described presently in the explanation of operation.

It will be noted in Figure 2 that the tubular member 50 is free to turn on the shaft or rod 51 and such manipulation is accomplished by the lateral arms 52, when required. The shaft 51 is oscillated and its inner end is affixed to an arm 53, the latter being pivoted on the shaft 39 which carries the pinion 38. Connected to the arm 53 and to the stationary member 33, is a spring 54 which serves to maintain the lever 51 in inoperative position as well as aiding the springs 21 in maintaining drum 11 and cat-head 3 in disengaged position. This action is obtained by reason of the fact that the operative end of arm 53 is toothed, as shown in Figure 1, the teeth engaging similar teeth 55 integral with ring 18 (see Figure 8). Accordingly, when the lever 51 is actuated, the ring 18 is oscillated and pins 17 are moved from one position to the other, thereby moving the drum 11 relative to its companion or rotating element, the cat-head.

In operation, the operating lever 51 is actuated to effect axial displacement of the drum 11, thereby to cause the same to move in the direction of the cat-head 3, as previously explained.

The drum is thus set into operation to wind the line thereon.

With the weight 47 and its line 46 in the position shown in Figure 1, the band 34 is expanded, as shown by Figure 5. However, as stated, under normal conditions, the effect of the weight is to maintain a constant tension on the band 34 by causing the shaft 39 to rotate in a counterclockwise direction, through the sheave 45. This action similarly rotates the pinion 38, the latter, due to its engagement with the rack 34, causes the latter to move upward thereby contracting the brake band 34 about the drum 24.

The tension imposed on the band 34 is, of course, dependent upon release of the dog 40 and is determined by the size of weight suspended on the line 46, but it need not be any greater than necessary to impose a normal tension to insure instantaneous response of the band when there is a tendency of the drum 11 to rotate in a reverse direction. When the latter occurs, the band 34 automatically contracts to suspend the load since it has the effect of a spiral about its drum, thereby increasing to a high degree of efficiency, its self energizing action.

The simplicity of the control is manifest in that an operator may efficiently manipulate the apparatus with only the single lever 51 since the weight or an equivalent means, maintains the friction means in readiness for operation at all times.

When it is desired to relieve the tension on the friction elements or brake, the tubular member 50, surrounding the lever 51, is rotated independently of the lever by the lateral arms 52. This action obviously rotates the sheave 45 carrying the weight line 46 to raise the weight 47 and through the shaft 39, and pinion 38, the rack 37 is caused to move downward, thereby relieving the tension on the band 34.

When it is desired to apply greater tension on the friction elements or band 34, the tubular element 50 is rotated in a direction opposite that just described, bringing about an opposite result on the band 34, that is to say, the latter is contracted to a degree greater than that effected by the weight alone.

Manifestly, the construction shown is capable of considerable modification and such modification as is considered within the scope and meaning of the appended claims is also considered within the spirit and intent of the invention.

I claim:

1. A friction brake and clutch including a constantly rotating clutch element and a rotatable and axially movable drum carrying a corresponding clutch element, a support, friction means in continuous control of said drum and capable of self energization effective upon rotation of said drum in one direction, an axially movable housing for said friction means having link connection with said support, means for normally maintaining a moderate tension on said friction means when said drum is hoisting a load, means for axially shifting said drum to effect engagement of said clutch elements and means for varying the degree of tension on said friction means.

2. A friction brake and clutch including a constantly rotating clutch element and a rotatable drum capable of axial displacement and carrying a corresponding clutch element, a stationary support, a line on said drum, friction means in continuous control of said drum and inherently capable of resisting rotation of said drum in one direction, a housing for said friction means and flexibly connected to said support, weight means arranged to normally maintain tension on said friction means, and means for increasing and decreasing the tension imposed on said drum through said friction means.

3. A friction brake and clutch including a rotatable member having a brake drum and capable of movement into and out of engagement with a continuously rotating element, a support therefor, a housing connected to said support and movable relative thereto, a friction means in said housing embracing the drum of said member and capable of self contraction to resist rotation of said member upon a tendency of the latter to rotate in one direction, means for maintaining a predetermined continuous tension on said friction means to hold the same in readiness for operation, means for controlling the movements of said rotatable member relative to said rotating element and means auxiliary to said latter means for manually varying the degree of tension on said friction means.

4. A friction brake and clutch including a normally rotating member and a normally stationary flanged drum receiving its driving power by movement into operative engagement with said normally rotating member, means for moving said drum, said means comprising a stationary and a relatively movable flange, radially spaced means between said flanges for thrusting said movable flange against said drum to displace the same, a self contracting friction means embracing one of the flanges of said drum, means for maintaining said friction means normally under tension when said drum is rotated in one direction, said friction means being impelled by reverse rotation of said drum to contract upon said flange, means operating said first means for moving said drum relative to said rotating member and for varying the degree of tension on said friction means.

5. In a friction brake and clutch, a rotating shaft and a stationary support, a flanged drum capable of free rotation on said shaft and arranged for axial displacement thereon, means for axially displacing said drum, said means comprising a pair of flanges, one of which is axially movable, a series of normally inclined thrust pins between said flanges, which, upon rotation of one of said flanges, will exert a pressure upon the companion flange; self acting friction means embracing one of the flanges of said drum and axially displaceable therewith, said friction means being arranged to resist rotative movement of said drum in one direction, weight means normally maintaining a slight tension on said friction means and a common operating lever to rotate the flange of said first means for axially displacing said drum and for actuating said friction means to affect the rotative speed of said drum.

6. A friction brake and clutch including a normally rotating member and a normally stationary flanged drum capable of axial displacement whereby to effect connection and disconnection thereof with said rotating member, a stationary support, a housing flexibly connected with said support and capable of axial movement with said drum, a friction band arranged on one of the flanges of said drum surrounded by said housing and encircling the flange more than one time whereby its effect will be to contract upon said flange when the tendency of said drum is to rotate in one direction, weight means operative to impose upon said friction means a predetermined and continuous tension, a common operating lever for axially displacing said drum and for varying the degree of tension on said friction means.

7. Apparatus for transferring a hoisted load to a stationary support comprising a hoisting drum and a stationary member, on which said drum is mounted a constantly rotating clutch element, brake means normally under moderate tension, operatively in control of said drum during rotation thereof in one direction and arranged to automatically resist rotation thereof in the opposite direction, means for varying the degree of tension on said brake means, lever means for moving said drum into engagement with said rotating clutch member to impart rotation to said drum, means carried by said lever for operating said tension varying means, and means indirectly connecting said brake means to said stationary support whereby the latter will be constrained to support the load hoisted by said drum when said brake means is operated.

8. Apparatus for transferring a hoisted load to a stationary support, comprising a constantly rotating clutch element and an axially movable hoisting drum having a friction brake housing, means to secure said housing to said stationary support, whereby to constrain the housing against rotation, a friction band disposed in said housing one end affixed to said housing and the other end adjustable, means suspended operatively to the adjustable end of said brake band to maintain a normal tension thereon, lever means for moving said drum axially into engagement with said clutch element and means carried by said lever for increasing and decreasing the tension on said band.

9. Apparatus for transferring a hoisted load from a hoisting drum to a stationary support, including in combination with said drum and support, means for moving said drum axially on its shaft, a housing supported by said drum and flexibly connected to said support, and capable of axial movement with said drum, a brake band in said housing having one end secured to said housing and the other free for adjustable movement, said band being inherently capable of contraction to hold said drum against rotation when the latter tends to rotate in one direction; means for imposing a continuous predetermined tension on the free end of said band, means for axially moving said drum and housing means for varying the degree of tension on said band and means for positively locking said band in frictional engagement with said drum.

10. Apparatus for transferring a hoisted load to a stationary support comprising a hoisting drum and a stationary member, on which said drum is mounted, a constantly rotating clutch element, brake means normally under moderate tension, operatively in control of said drum during rotation thereof in one direction and arranged to automatically resist rotation thereof in the opposite direction, means for varying the degree of tension on said brake means, lever means for engagement of said drum with said rotating clutch member to impart rotation to said drum, means carried by said lever for operating said tension varying means, and means indirectly connecting said brake means to said stationary support, whereby the latter will be constrained to support the load hoisted by said drum.

WALTER W. FOSTER.